US008019360B2

(12) United States Patent
Qahwash

(10) Patent No.: US 8,019,360 B2
(45) Date of Patent: Sep. 13, 2011

(54) CRC-BASED MESSAGE DETECTION/DEMODULATION APPARATUS AND METHOD FOR RADIO FREQUENCY SIGNALS

(75) Inventor: Murad Qahwash, Orlando, FL (US)

(73) Assignee: Locus Location Systems, LLC, West Melbourne, FL (US)

( * ) Notice: Subject to any disclaimer, the term of this patent is extended or adjusted under 35 U.S.C. 154(b) by 1045 days.

(21) Appl. No.: 11/738,634

(22) Filed: Apr. 23, 2007

(65) Prior Publication Data
US 2009/0075674 A1 Mar. 19, 2009

Related U.S. Application Data

(60) Provisional application No. 60/793,756, filed on Apr. 22, 2006.

(51) Int. Cl.
*H04W 24/00* (2009.01)
(52) U.S. Cl. ............... 455/456.5; 455/456.1; 455/456.2; 455/456.3; 455/456.4; 375/259
(58) Field of Classification Search .................. 455/452, 455/456.1, 456.5; 375/259
See application file for complete search history.

(56) References Cited

U.S. PATENT DOCUMENTS

| | | | | |
|---|---|---|---|---|
| 5,220,584 A | * | 6/1993 | Burns | 375/340 |
| 5,266,953 A | * | 11/1993 | Kelly et al. | 342/47 |
| 5,548,583 A | * | 8/1996 | Bustamante | 370/335 |
| 5,596,330 A | * | 1/1997 | Yokev et al. | 342/387 |
| 5,629,708 A | | 5/1997 | Rodal | |
| 5,652,772 A | * | 7/1997 | Isaksson et al. | 375/367 |
| 5,883,598 A | * | 3/1999 | Parl et al. | 342/457 |
| 5,890,068 A | * | 3/1999 | Fattouche et al. | 455/456.2 |
| 6,031,490 A | * | 2/2000 | Forssen et al. | 342/457 |
| 6,084,886 A | * | 7/2000 | Dehner et al. | 370/458 |
| 6,310,576 B1 | * | 10/2001 | Johnson | 342/465 |
| 6,317,474 B1 | * | 11/2001 | Carsello | 375/354 |
| 7,155,237 B2 | * | 12/2006 | Porcino | 455/456.1 |
| 7,408,898 B1 | * | 8/2008 | Brown | 370/328 |

OTHER PUBLICATIONS

Cong and Zhuang Hybrid TDOA/AOA Mobile User Location for Wideband CDMA Cellular Systems IEEE Transactions on Wireless Communications, vol. 1, No. 3, Jul. 2002 pp. 1439-1447.
Deng and Fan An AOA Assisted TOA Positioning System Proceedings of WCC-ICCT 2000, vol. 2 pp. 1501-1504.
Ho and Chan Solution and Performance Analysis of Geolocation by TDOA IEEE Transactions on Aerospace and Electronic Systems, vol. 29, No. 4, Oct. 1993 pp. 1311-1322.
Gu and Rappaport A Dynamic Location Tracking Strategy for Mobile Communication Systems Proceedings IEEE VTC 1998 pp. 259-263.

* cited by examiner

*Primary Examiner* — Dwayne Bost
*Assistant Examiner* — Sowmini Nair
(74) *Attorney, Agent, or Firm* — John L DeAngelis; Beusse Wolter Sanks Mora & Maire, P.A.

(57) ABSTRACT

A method for determining a location of a wireless transmitting device transmitting a digitally modulated transmitted radio frequency signal. The method comprises, at spaced-apart receivers: generating a received radio frequency signal and including time tags therein responsive to the transmitted radio frequency signal, detecting a destination message signal responsive to the received radio frequency signal, comparing the destination message signal and the received radio frequency signal and determining a time of arrival of the destination message signal responsive to the step of comparing and responsive to the time tags. The method further comprises determining a pairwise time difference of arrival of the received radio frequency signal for two pairs of receivers and determining the location of the device responsive to the pairwise time difference of arrival.

9 Claims, 11 Drawing Sheets

RF GEO-LOCATING SYSTEM

N-BIT SINGLE BLOCK MESSAGE
(K INFORMATION BITS + R CRC BITS)

*FIG. 4*

N-BIT CODED TX DATA BLOCK

*FIG. 5*

| N-BIT CODED TX DATA BLOCK #1 FOR A 2-BLOCK MESSAGE | 6 BITS | N-BIT CODED TX DATA BLOCK #2 FOR A 2-BLOCK MESSAGE |

*FIG. 6*

| N-BIT CODED TX DATA BLOCK OF SINGLE BLOCK MESSAGE #1 | N-BIT CODED TX DATA BLOCK OF SINGLE BLOCK MESSAGE #2 |

*FIG. 7*

|    | t1  | t2  | t3  | t4  | t5  |
|----|-----|-----|-----|-----|-----|
| 10 | [X] | [X] | X   | S10 | [S10] |
| 9  | X   | X   | [X] | S9  | [S9] |
| 8  | X   | X   | S8  | [S8] | S8  |
| 7  | [X] | [X] | S7  | [S7] | S7  |
| 6  | X   | S6  | [S6] | S6  | [S6] |
| 5  | X   | S5  | [S5] | S5  | S5  |
| 4  | [X] | [S4] | S4  | [S4] | S4  |
| 3  | S3  | [S3] | S3  | S3  | [S3] |
| 2  | S2  | S2  | [S2] | S2  | S12 |
| 1  | [S1] | S1  | S1  | [S1] | S11 |

FIG. 12

CRC-BASED MESSAGE DETECTION/DEMODULATION APPARATUS AND METHOD FOR RADIO FREQUENCY SIGNALS

The present application claims the benefit under Section 119(e) of the provisional patent application filed on Apr. 22, 2006 and assigned application No. 60/793,756.

FIELD OF THE INVENTION

The present invention relates generally to systems for demodulating radio frequency (RF) signals and detecting the information or message carried by the RF signal, and more particularly to systems and methods for reducing bit errors and false alarms in the demodulation and detection process.

BACKGROUND OF THE INVENTION

A plurality of wireless communications services are now available for communicating between a central site and multiple mobile or portable users. A trunked radio system, one such service, allows portable or mobile users (for example, public safety or emergency service providers) to communicate with others in an assigned radio group and a group dispatcher, over assigned frequency channels within a defined geographic region. When the user desires to talk to the dispatcher or another user in the radio group, he activates a push-to-talk "button" on his wireless communications device. The device (sometimes referred to as a radio in the public safety system) transmits an inbound control signal received at a base station. Responsive thereto, the base station assigns a frequency channel for the user's call and transmits an outbound control signal that forwards the frequency assignment to all communications device within the radio group. The user can then send a voice or data message on the assigned channel; the message will be heard by all users in the radio group.

A cellular telephone system comprises a plurality of cells, each having a transmitting/receiving base station for sending and receiving signals from the mobile users operating within the cell according to known system protocols (e.g., CDMA, AMPS, TDMA, etc.). As the cell phone user moves into the coverage area of an adjacent cell, the cell phone signal is handed off from the base station of the original cell to the base station of the adjacent cell.

In a wireless communications systems, such as the cellular telephone or trunked radio systems, it is sometimes desired to determine a mobile user's location. For example, to provide emergency services to a mobile cellular user, the cellular system includes an emergency services feature, such as a "911" service (referred to as E911 or enhanced 911 service). When a mobile user requiring emergency services initiates a 911 call a geolocating process determines the calling party's location so that emergency personnel can be dispatched to the site. A public safety, dispatcher operating over the trunked radio system may need know each user's location within the service region to properly deploy personnel to a specific site as required to render needed services. Knowing the location allows the dispatcher to efficiently dispatch service providers to locations where the services are required.

It is known that a GPS (global positioning satellites) system is commonly used to determine a location, such as the location of a mobile or portable wireless communications system user. A GPS receiver receives and processes time-based signals from at least three GPS satellites to determine its, and the users, location. However in certain situations it is also desired for another party associated with the communications system, such as a public safety dispatcher or emergency services provider, to know the location of the mobile or wireless user. After the GPS receiver determines the user's location, a communications device must convey the location information to the other party, at the expense of time and communications bandwidth. Further, location accuracy of a GPS system suffers when interference disrupts the signal from one or more of the three satellites, such as when the receiver is inside a structure or when the line of sight from the receiver to the satellites is obscured.

In certain applications it is therefore desired to determine the users location by other more robust techniques capable of accurate location determination without the necessity of receiving three satellite signals, thereby avoiding the detrimental aspects of the GPS system. It may also be desired for the determined location to be supplied to another party, such as the dispatcher or services provider mentioned above.

Time difference of arrival (TDOA) (also referred to as geometric triangulation) geo-location is one known technique for accomplishing these objectives. A signal transmitted from the mobile or portable user's device is received by at least three receiving sites (typically ground-based receiving sites). The pairwise time difference of arrival at all receiving site pairs is determined by correlating the signal received at one site of the pair with the same signal received at the other site of the pair. To ensure that each site of the pair processes the same received signal, a known and unique portion of the signal (a preamble with a known format, for example) is commonly detected and used in the correlation process.

The relationship between distance and time is given by $d=ct$, where c is the speed of light, t is the transit time of the signal and d is the distance between a transmitting and a receiving site. Thus the time difference between receipt of a signal at two receiving sites corresponds to the difference in distance between the transmitting site and each of the two receiving sites. With the TDOA approach, a signal received at n receiving sites yields $n(n-1)/2$ pairs of time difference of arrival values that determine the location of the wireless communications device. Each pairwise TDOA value generates a locus of points in the form of a hyperbola. An intersection of at least three hyperbolas uniquely determines the location of the communications device.

The signal received at each receiving site is nearly identical, with differences typically caused by channel impairments, non-identical noise characteristics encountered in the signal paths between the wireless communications device and the receiving sites, multipath effects, fading, non-identical analog processing components at the receiving sites. The detection accuracy of the receiver at the receiving sites directly affects the TDOA value and therefore directly affects location determination accuracy. A detection process at each site that minimizes a bit error rate and false alarm rate produces a more accurate location determination.

As illustrated in FIG. 1, according to the prior art time-difference-of-arrival technique, a wireless communications device 2 transmits a radio frequency (RF) signal modulated by a baseband information signal (message) that is received at plural receiving stations 4. The RF signal may comprise, for example, a control signal (i.e., for use in controlling operation of the device 2). In the example system of FIG. 1, the plural receiving stations 4, designated RX1, RX2 and RX3, have a common time reference (not shown), such as a signal received from a high precision clock on a geosynchronous satellite, a signal received from a central processing site or highly stable internal clocks (which can be periodically updated or synchronized to an external time reference).

The signal received at each of the receiving stations 4 is detected and the baseband information signal supplied to the central processing site 6 where the signals are pairwise correlated to determine the pairwise TDOA information. A system employing this technique is referred to as a centralized cross-correlation system. The time difference of arrival is calculated in the time domain by deterring the cross-correlation function for the two baseband information signals. The correlation is carried out directly according to the cross-correlation integral or by the discrete time equivalent of the cross-correlation integral, to generate the cross-correlation function. The cross-correlation is a function of the offset between the two signals, and the cross-correlation function peak (the point of highest correlation between the two signals) identifies the time offset between the signal received at the two receiving sites. That is, the time difference of arrival of the signal at the two receiving base stations equals the time offset at the function peak.

The cross-correlation function peak is typically determined by sampling the cross-correlation function and comparing samples until the peak is found. In this search process there can be some difficulty in accurately determining the peak's location because the peak is unlikely to fall directly on a time sample. Thus, if time difference of arrival values are to be determined more precisely than the sampling period, the cross-correlation function must be interpolated between sample periods to find the function peak. Alternatively, the cross-correlation function can be over-sampled during die peak search process, but this is accomplished at the expense of increased computational overhead and processing time.

As described above, channel impairments, noise, multipath effects, non-identical processing in the receiving site signal paths, etc. affect signal detection accuracy at each site, in turn affecting the accuracy of the cross-correlation results and the peak location. The accuracy of the determined user's position also depends on the sharpness/narrowness of the correlation peak. Determination of the correlation peak is improved by limiting bit errors and false alarms in the detected signal. Thus improving die integrity of the signal detection process consequently improves the accuracy of the determined location.

Generally, the time difference of arrival of the same signal at any two receiving stations is a constant (ignoring motion of the wireless communications device) and assuming flat terrain, yields a locus of points along a hyperbola. (If the terrain is not flat, a hyperbola of rotation is the surface to be considered as it intersects the terrain.) For example, with reference to the schematic representation of FIG. 2, the possible locations of a wireless communications device transmitting a signal that arrived at receiving site RX1 at $t_1$ and arrived at receiving site RX2 at $t_2$ are defined by a locus of points forming a hyperbola curve 16, where the curve is defined by $t_2-t_1=k_1$, where $k_1$ is a constant. Clearly it is not possible to determine a precise location of the wireless communications device 2 with only two receiving sites reporting time-of-arrival information. Including the signal TOA information from the receiving site RX3 generates two additional curves based on the signal's time difference of arrival at the three receiving sites taken in pairs. One such curve is determined by the time difference of arrival between receiving stations RX1 and RX3 (curve 17), and the other is determined by the time difference of arrival between receiving stations RX2 and 1R3 (curve 18). The intersection of the curves 16, 17 and 18 is the geolocation of the wireless communications device 2.

It is known that in certain situations it may be possible to determine the location of the wireless communications device using the TDOA results from three receiving stations bar calculating only two time difference of arrival values. The two generated hyperbolae will intersect at two points and thus the mobile location is not uniquely determinable. However, when the two points of intersection are overlaid with an area map showing various man-made and natural features, it may be possible to eliminate one of the two intersections as a possible mobile location. For example, if it is assumed that the wireless communications device is on a road, and only one of the two curve intersections occurs along a road, then the other potential location is eliminated from consideration. Alternatively, one of the receiving sites may be able to determine the sector of the azimuth plane (or the angle of arrival) from which the wireless communications device signal is received. When coupled with the two possible locations at the intersection of the two hyperbolae, this angle of arrival information permits selection of the actual location from the two possible locations.

BRIEF SUMMARY OF THE INVENTION

In one embodiment the invention comprises a method for determining a location of a wireless transmitting device transmitting a digitally modulated transmitted radio frequency signal. The method further comprising, at spaced-apart receivers: generating a received radio frequency signal and including time tags therein responsive to the transmitted radio frequency signal, detecting a destination message signal responsive to the received radio frequency signal, comparing the destination message signal and the received radio frequency signal, determining a time of arrival of the destination message signal responsive to the step of comparing and responsive to the time tags, and also determining a pairwise time difference of arrival of the received radio frequency signal for two pairs of receivers and determining the location of the device responsive to the pairwise time difference of arrival.

In another embodiment the invention comprises an apparatus for detecting a valid message from among received signal samples at a receiving site, the message comprising symbols. The apparatus further comprising: first memory locations for storing the received signal samples, wherein successive received signal samples are incrementally input to successive first memory locations, bit detectors, each bit detector associated with one of the first memory locations, wherein the sample value stored in the one of the first memory locations is input to the associated bit detector for producing a bit value, a memory buffer having a number of second memory locations equal to the number of bit detectors, each bit detector supplying the bit value to the associated second memory location and a first module operating on the bit values in the memory buffer for determining if the bit values present a valid message, and wherein if a valid message is not presented, a next received signal sample is input to a next one of the first memory locations, overwriting a sample previously stored therein and the bit detectors are associated with a next one of the first memory locations, the first module operating on bit values until a valid message is presented in the memory buffer.

BRIEF DESCRIPTION OF THE DRAWINGS

The present invention can be more easily understood and the advantages and uses thereof more readily apparent when the following detailed description of the present invention is read in conjunction with the figures wherein:

FIG. 4 is a diagram of a message block structure for the n-bit data block message of the GMSK transmitter of FIG. 3.

FIG. 5 is a diagram of a message block structure for the N-bit encoded data block message of the GMSK transmitter of FIG. 3.

FIG. 6 is a diagram of a message block structure for the two-block encoded data message of the GMSK transmitter of FIG. 3.

FIG. 7 is a diagram of a message block structure for the back-to-back encoded single block data message of the GMSK transmitter of FIG. 3.

FIG. 12 depicts processing of samples stored within the buffer of FIG. 10.

In accordance with common practice, the various described device features are not drawn to scale, but are drawn to emphasize specific features relevant to the invention. Reference characters denote like elements throughout the figures and text.

DETAILED DESCRIPTION OF THE INVENTION

Before describing in detail the particular method and apparatus related to demodulating and detecting radio frequency signals, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The following embodiments are not intended to define limits as to the structure or method of the invention, but only to provide exemplary constructions. The embodiments are permissive rather than mandatory and illustrative rather than exhaustive.

The invention presents a robust, fast, efficient, localized, cross-correlation apparatus and method for demodulating and detecting a digital information signal or message signal modulating an RF signal. The detected signal according to the invention has a lower bit error rate than prior art techniques. Further, the invention does not require knowledge of or use of a signal preamble, synchronization bits or any other signal-embedded timing information. Further, in another embodiment the apparatus and method precludes the occurrence of false alarms. An undesired false alarm occurs in a communications receiver when an error correcting code (for example, a cyclic redundancy code (CRC)) indicates that the detected bits are correct (the CRC check returns a zero), when in fact there is at least one error in the bits that was not detected and/or corrected by the error detecting code. Such a situation arises when, for example, the error correcting code is not sufficiently "strong" to detect and correct all expected errors. It is of course desired to eliminate false alarms to enhance the integrity of the detected data bits.

Figure 1:
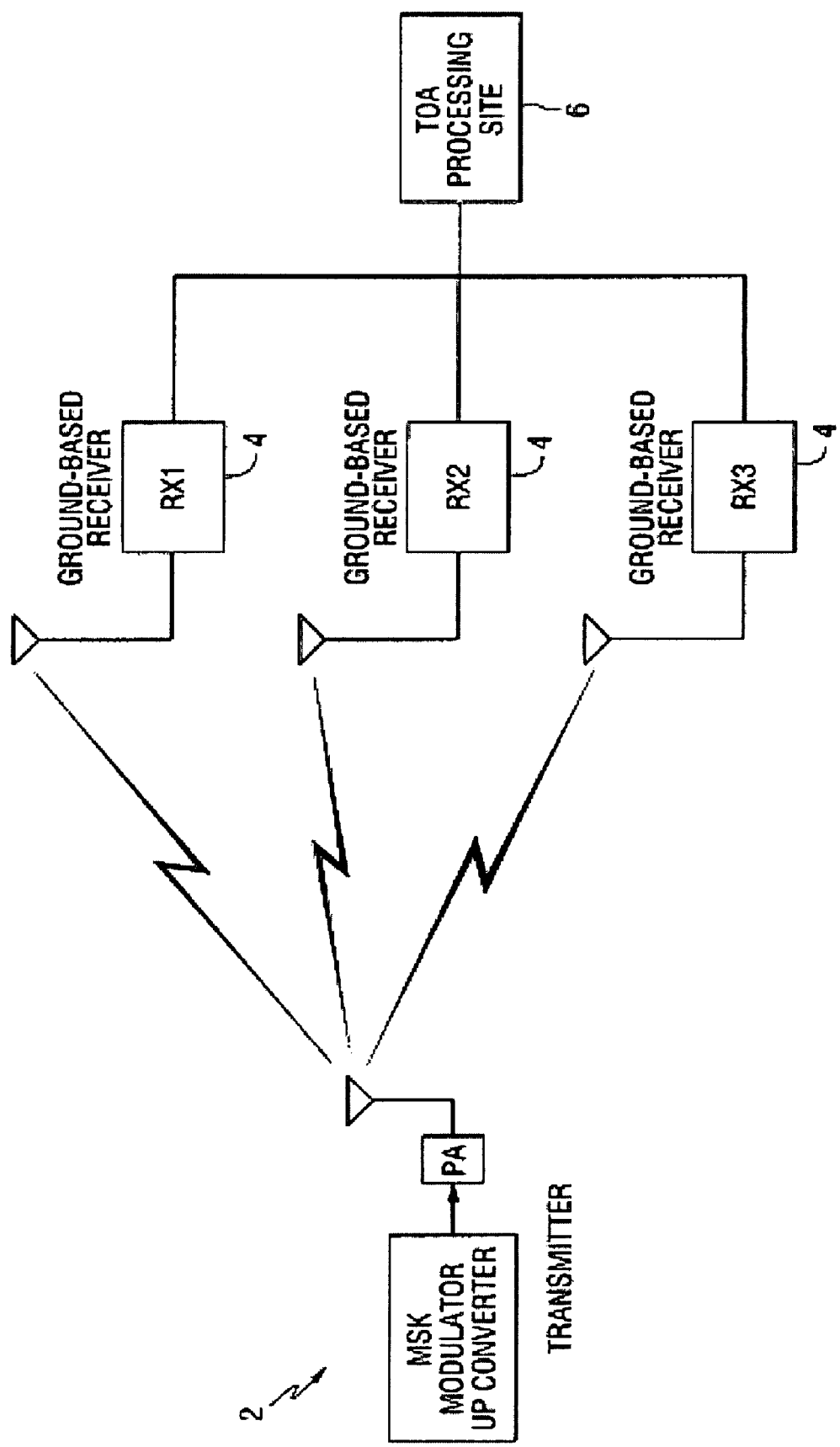
FIG. 1 is a block diagram of a prior art geolocation system.
Figure 2:
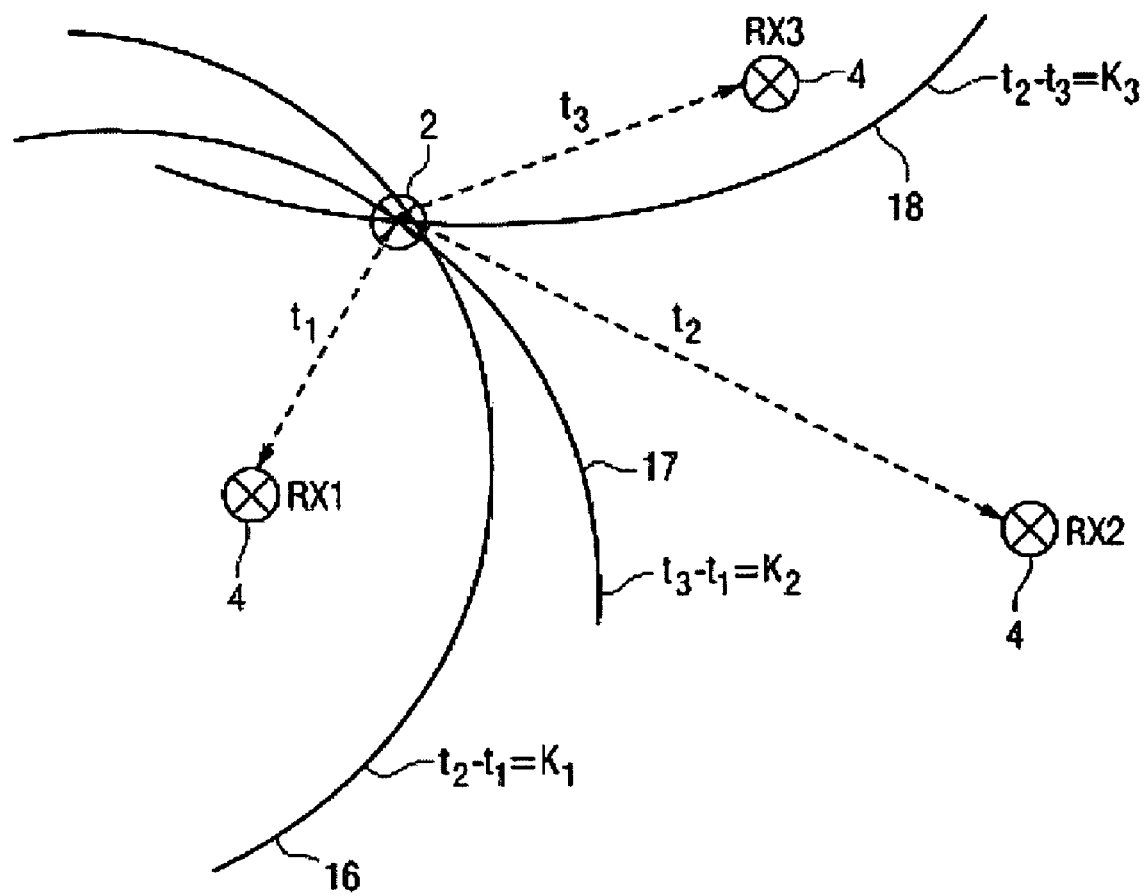
FIG. 2 is a depiction of a prior art time of arrival geolocation process.

In one application, the teachings of the invention are applied to systems and methods for locating a transmitting (wireless) communications device by determining the TOA of its RF signal at a plurality of receiving sites (see FIG. 2), determining the TDOA of the signal between pairs of the plurality of receiving sites and determining the location of the communications device from the TDOA. In one such application, the present invention operates at each receiving site (referred to as localized cross-correlation) to detect a received signal (e.g., a message signal or an information signal) and determine the TOA of the RF signal, without a priori knowledge of the specific contents of the received signal or use of a preamble or synchronization bits. Since the detected signal produced by the invention presents a low bit error rate and zero false alarms, the invention generates a better defined and therefore more easily detected correlation peak from which the TOA is determined. A more accurate TOY produces a more accurate location determination. Although the present invention is described in the context of a locating system, those skilled in the art recognize that there are other applications for the invention, including use as a digital signal detector.

The teachings of the invention can be applied to radio frequency signals employing any digital modulation technique, including but not limited, to BPSK, FSM, MPSK, QAM, MSK, GMSK (Gaussian-minimum-shift-keying) or any derivative of these modulation schemes. The invention is described in the context of a GMSK modulated signal, but the teachings are not limited to GMSK signals. The teachings of the invention can be applied to the detection of a any binary signal that digitally modulates any RF signal, including signals lacking a preamble, synchronization bits and other timing information.

Figure 3:
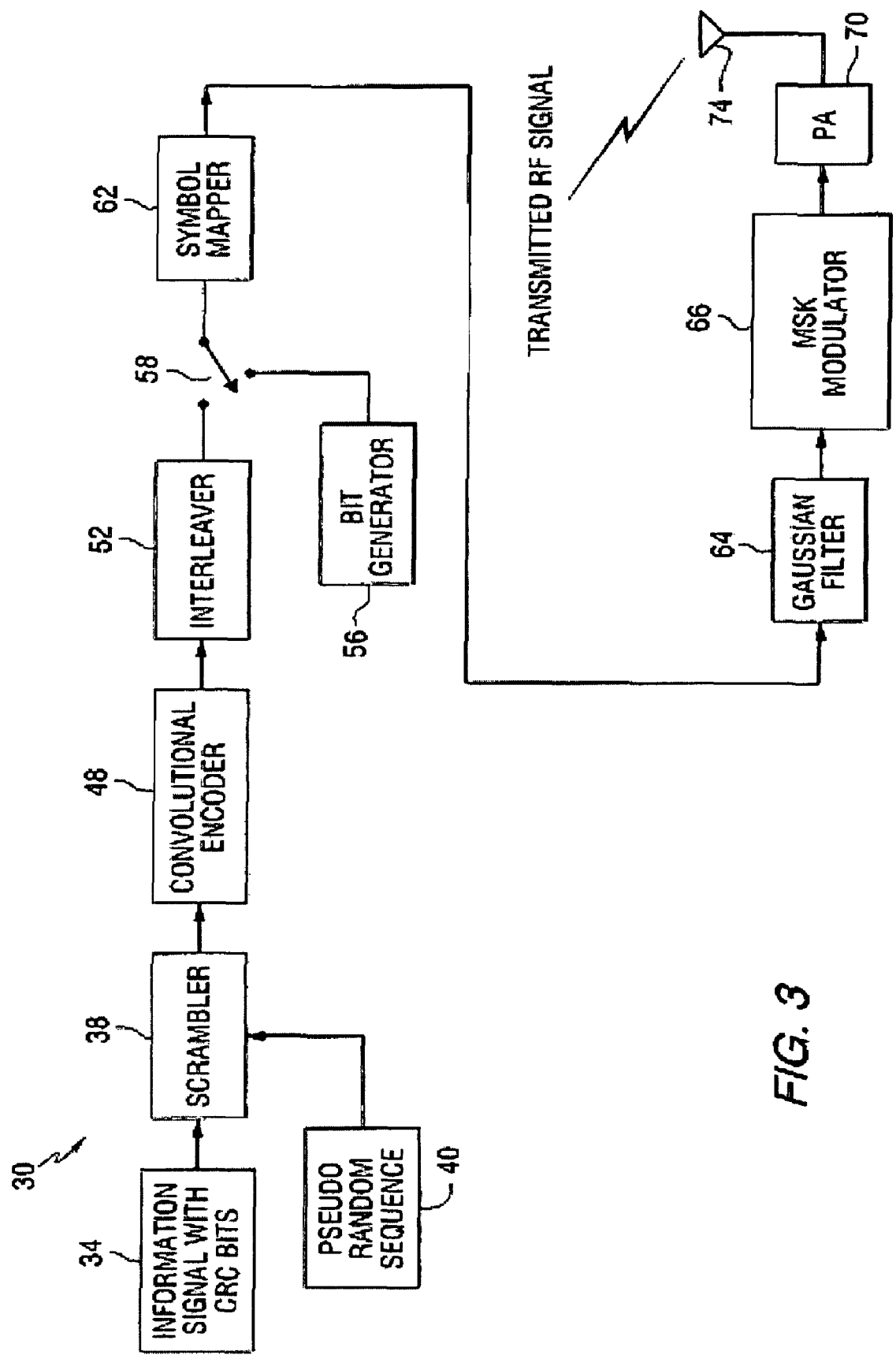
FIG. 3 is a block diagram of a GMSK transmitter.

FIG. 3 illustrates a functional block diagram of a transmitter 30 for producing and transmitting a GMSK modulated RF signal carrying an information or message signal. In one example, the transmitter is an element of a radio operating in a trunked radio system, the radio further comprising a receiver. The invention is explained in the context of this system.

The user activates the radio when he desires to transmit a signal, typically by pushing a push-to-talk button, causing the transmitter 30 to transmit an inbound control signal (on a known pre-assigned inbound control channel or inbound control frequency). The inbound control signal, referred to as an event in the context of the present invention, requests that a base station assign a voice channel for the user's call. The base station receives the inbound control signal, assigns a frequency channel to the call and transmits an outbound control signal to the user advising the assigned frequency. Upon receipt of the outbound control signal, the user's radio retunes to the assigned channel for sending and receiving messages (voice signals or data signals) over the assigned channel.

When the teachings of the present invention, as described further below, are employed at a plurality of receivers operating to determine a location of the transmitter 30, each of the plurality of receivers receives and determines the time of arrival of the inbound control signal. The pairwise time differences of arrival of the signal at the plurality of receivers are determined and the transmitter's location determined from the TDOA values, as described above. However, the teachings of the present invention are not limited to time of arrival and location determination, but can be used to improve the demodulation and detection of any digitally modulated RF signal.

Returning to transmitter of FIG. 3, the information signal or message is generated by known techniques (such as by using a vocoder to generate a digital signal from a voice signal) and error detection and correction bits appended thereto. In the presented example, a cyclic redundancy code (CRC) word is appended to the information bits according to known techniques. An output of a functional block 34 comprises the information signal bits plus the appended CRC bits, referred to as an encoded information signal. The encoded signal comprises k information bits and r appended CRC bits, thus having a length of n=k+r bits as depicted in FIG. 4.

If the encoded bit stream comprises a sequence of c-bit words, each word encoding a portion of the information signal and including the appended CRC bits, the encoded signal is referred to as a single block encoded signal or bit stream. If each n-bit word is repeated in the encoded bit stream, the bit stream is referred to as a double block encoded signal. Although described in the context of a digital signal comprising binary bits representing information, the teachings of the invention also apply to symbols representing information.

A scrambler 38 randomizes the encoded signal (referred to as pre-whitening according to a pseudo-random scrambling sequence supplied by a functional block 40. Signal scrambling enhances signal security. A typical scrambling operation supplies the encoded information bits to a first input terminal of an XOR (exclusive OR) gate and a predetermined random scrambling bit sequence at a second input terminal. The XOR output signal thus comprises a scrambled version of the input signal. The scrambling bit sequence is known at the receiver where it is employed to descramble the data.

The scrambled encoded signal is further encoded at ½ rate in a convolutional encoder 48 to form encoded blocks of N=2n bits. An N-bit encoded block is depicted in FIG. 5.

Each N-bit block is processed through an interleaver 52 of FIG. 3 where the bits within each block are interleaved according to known techniques.

In an embodiment comprising a double block encoded signal format, a 6-bit "101010" bit pattern is supplied from a bit generator 56 and inserted between the first and second encoded blocks of the two-block signal, as controlled by a switch component 58. The switch component 58 is operative in a first state for signal block encoded signals such that the bit generator 56 is removed from the data path. In a second state, operative for double block encoded signals, the bit generator 56 inserts the "101010" bits between two consecutive blocks of the two-block encoded signal, as schematically illustrated in FIG. 3. The encoded signal structure for a two-block message is depicted in FIG. 6.

The encoded back-to-back single-block encoded message appears as a concatenated encoded signal as seen in FIG. 7.

The encoded signal is processed through a serial path comprising a symbol mapper 62, a Gaussian filter 64, an MSK modulator 66, a power amplifier 70 and an antenna 74. The symbol mapper 62 maps a binary logic zero to a voltage representing a −1 and maps a logic one to a voltage representing a +1. The resulting voltage signal bit stream is input to the Gaussian alter 64. The Gaussian filter filters the high frequencies from the input bit stream, characterizing the MSK modulation as GMSK.

The various signal processing operations depicted in FIG. 3 are commonly employed in digital modulation protocols and are not unique to GMSK modulation nor are they required to implement the teachings of the present invention.

As stated above, the present invention applies to all digital modulation techniques, although GMSK is used to convey a clear description of the invention. A brief theoretical description of GMSK is presented. A GMSK signal is an FM modulated carrier where the modulating signal is a filtered Gaussian bit stream, as supplied by the Gaussian filter 64 of FIG. 3. The impulse response of the filter 64 is a Gaussian function characterized by its pulse width and its time bandwidth product. The pulse is defined by:

$$h(t) = \frac{1}{\sqrt{2\pi}\,\Delta T} e^{-\frac{t^2}{2\Delta^2 T^2}} \quad (1)$$

Where $$\Delta = \frac{\sqrt{\ln 2}}{2\pi BT},$$

T is the bit period and B is the 3 dB bandwidth of the modulated spectrum. In GMSK, typically BT=0.3. The data stream can be modeled as series of impulses weighted by the binary data $d_i$ (±1). The Gaussian filtered data stream is thereby obtained by convolving the binary weighted impulses with the Gaussian filter impulse response as shown in equation (2) below.

$$g(t) = \sum_k d_i \delta(t - KT) * h(t) = \sum_k d_i h(t - KT) \quad (2)$$

Within the MSK modulator 66 of FIG. 3, the GMSK modulated signal is generated by FM modulating an RF carrier having a carrier frequency of $f_c$ and a frequency deviation constant of $K_f$ (Hz/Volt) with g(t) from equation (2). The resulting transmitted RF signal is described by equation (3):

$$x(t) = A\cos\left[2\pi f_c t + 2\pi K_f \int_0^t g(\alpha)d\alpha\right] \quad (3)$$

Using equations (2) and (3), the GMSK carrier can be expressed as shown in equation (4).

$$x(t) = A\cos\left[2\pi f_c t + 2\pi K_f \int_0^t \sum_k d_k h(\alpha - kT)d\alpha\right] \quad (4)$$

Figure 8:
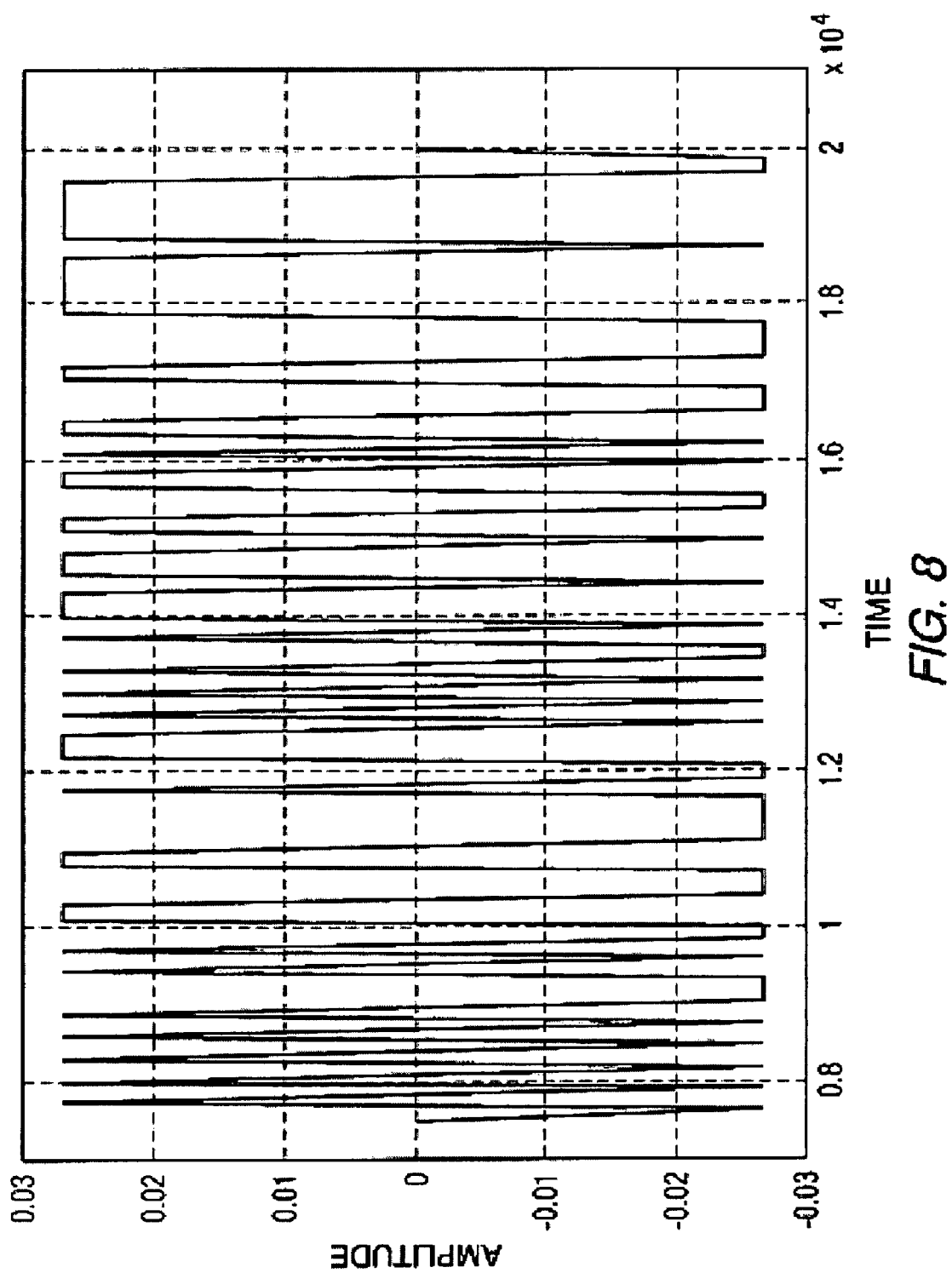
FIG. 8 is a plot of a GMSK modulated carrier.

An exemplary instantaneous frequency deviation of the GMSK modulator output signal is shown in FIG. 8.

Figure 9:
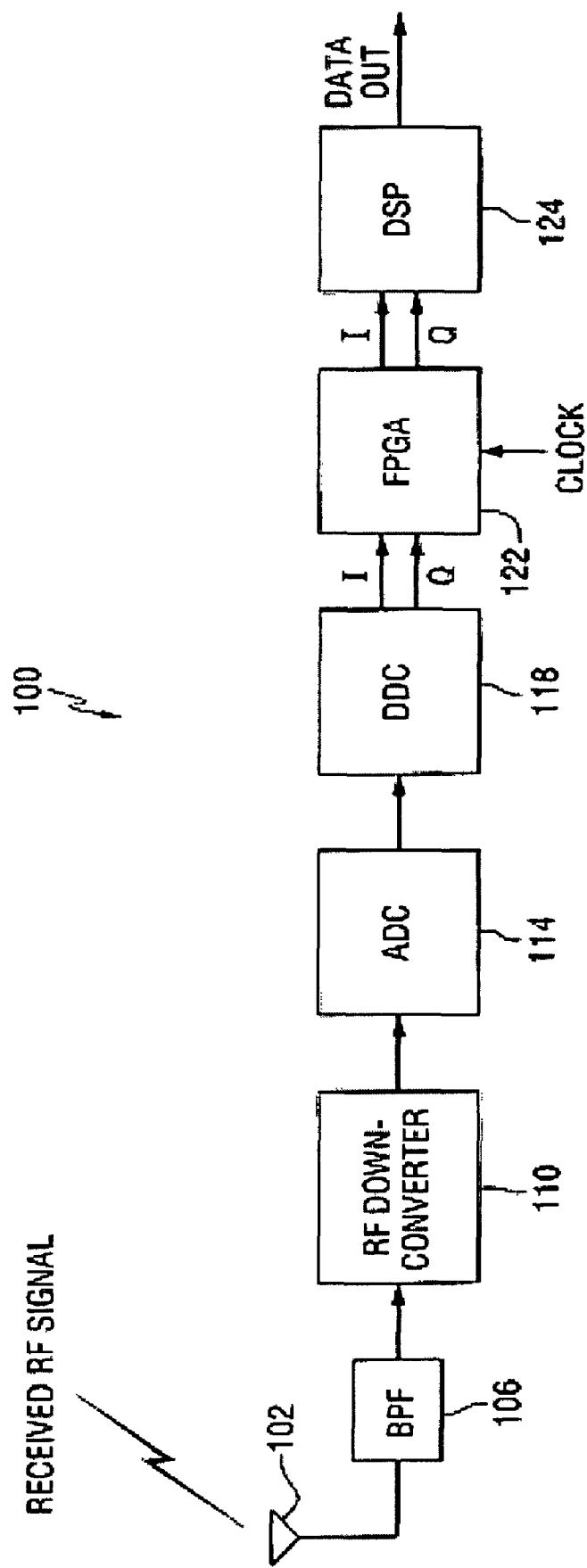
FIG. 9 is a block diagram of a GMSK receiver according to the teachings of the present invention.

FIG. 9 shows a block diagram of a digital receiver (detector/demodulator) 100 to which the teachings of the present invention can be applied. The receiver 100 can process, and thus the invention can be applied to, single block data (also referred to as back-to-back encoded blocks) as illustrated in FIG. 7 and to double encoded blocks as illustrated in FIG. 6.

In one application, the receiver 100 receives signals from a trunked radio, and operating in conjunction with two or more additional receivers determines a location of the radio user according to the TDOA principles. Specifically, the receiver 100 processes the received RF signal to produce a detected signal with improved signal integrity and no false alarms.

Thus when the receiver 100 is employed in a TDOA application the accuracy of the TOA estimate and the transmitter's location are both improved over prior art TDOA techniques.

The RF signal transmitted by the transmitter 30 of FIG. 3 that is detected and processed to determine the location of the transmitter 30 is referred to as an event. In one application the event comprises the inbound control signal in a trunked radio system as described above. The event signal is received at an antenna 102 and processed through an RF bandpass front-end filter (BPF) 106 for frequency preselection and image rejection as is known by those skilled in the art. The filtered RF signal is downconverted to a suitable intermediate frequency (IF) in an RF down converter 110. In one embodiment the intermediate frequency is 10.7 MHz.

The IF signal is then digitized in an analog-to-digital converter (ADC) 114. In one embodiment the ADC 114 comprises a 14 bit analog-to-digital converter, sampling at 500 kHz (one sample every 2000 ns) to generate a digital signal at 50 MHz or 50 Msamples/sec. As is known by those skilled in the art, other sampling rates can be used, but the sampling rate must comply with the Nyquist sampling theorem and take into account the signal frequency and bandwidth.

The accuracy of the time of arrival information as determined by subsequent signal processing as described below, is directly related to this sampling rate. In turn, the accuracy of the time difference of arrival and thus the accuracy of the location increases with the sampling rate. However, increasing the sampling rate may be limited by data storage constraints (i.e., for storing the digital samples), available processing power of subsequent signal processing stages and further by the time allotted to process the samples to determine the time of arrival and thus the transmitter's location.

A digital down converter (DDC) 118 down-converts the digitized IF signal to baseband according to known demodulation techniques where the digitized IF signal is mixed with an oscillating signal of 10.7 MHz in an I channel and Q channel and filtered to remove unwanted spectral components. The DDC 118 further decimates the baseband signal, by a factor of 40 in one embodiment, to produce I and Q baseband signals at 1.25 Msamples/sec. In one application, the I and Q signals each have a baud rate of 3600.

The baseband I and Q signals are input to an FPGA 122 that is further responsive to a timing signal, for example from a GPS satellite transmitting one timing pulse per second. When the receiver 100 is employed in a location-determining system the FPGA 122 in each receiver is responsive to the same timing signal and thus the receivers are time-synchronized. In an embodiment where the FPGA 122 is responsive to an internally-generated timing signal, all receiver clocks must be synchronized according to known techniques. As is known by those skilled in the art, in another embodiment the FPGA can be replaced by software and/or hardware components that perform the same functions.

Figure 10:
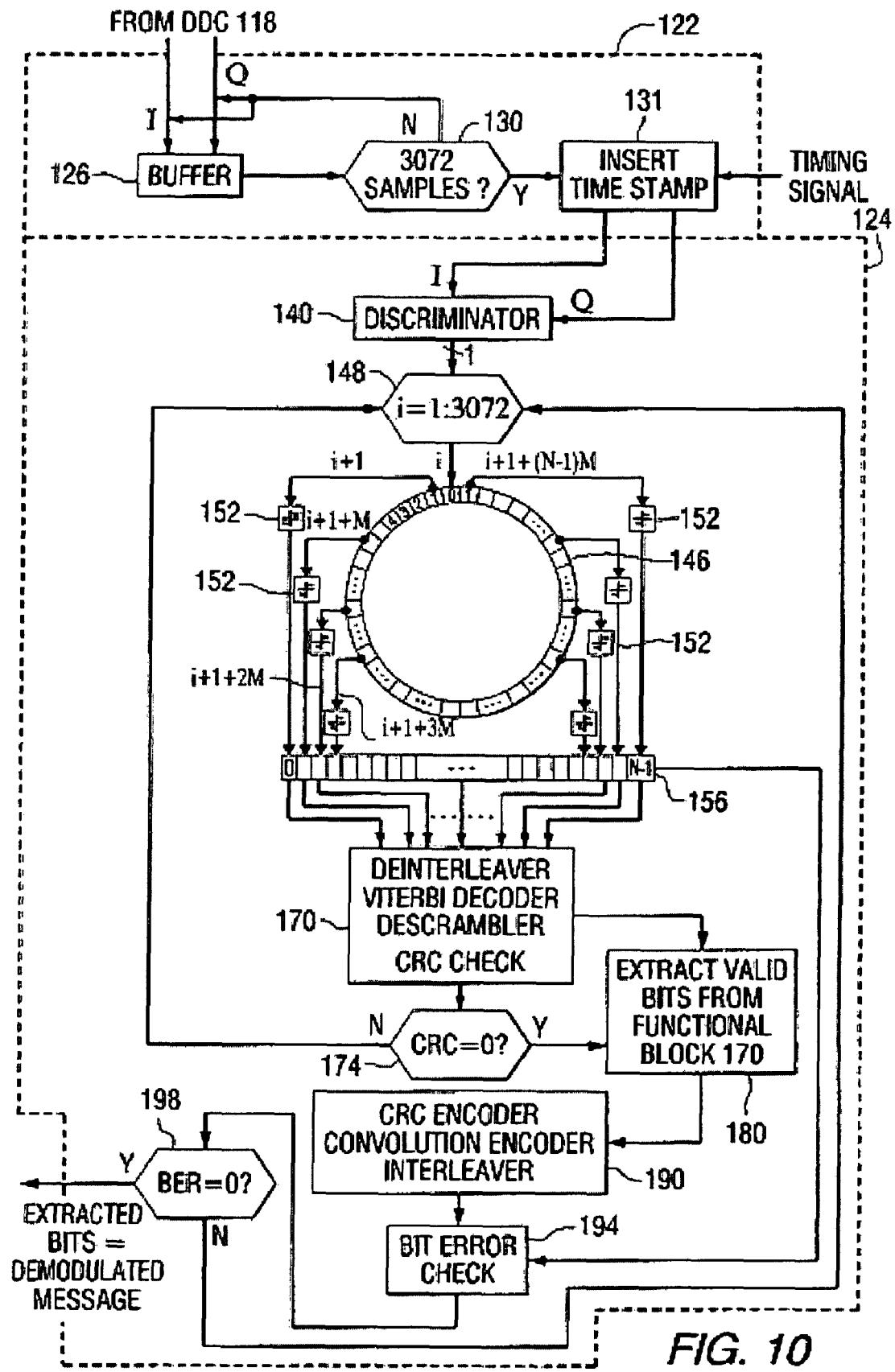
FIG. 10 is a block diagram of a buffer, and associated components, of the GMSK receiver of FIG. 9.

FIG. 10, a partial block diagram and partial processing flow chart, illustrates functional details of the FPGA 122 and a digital signal processor (DSP) 124. As the I and Q samples are loaded from the DDC 118, they are buffered in an input buffer 126 and counted, as represented by a decision block 130 in FIG. 10. When the count reaches a predetermined value, a time stamp (e.g., a value indicating an offset from an immediately previous timing signal, in one embodiment the timing signals are received at 1 pulse per second) responsive to a timing signal is inserted into both the I and Q bit streams during a time stamp insertion step 131. In one embodiment the predetermined count value is 3072.

Figure 11:
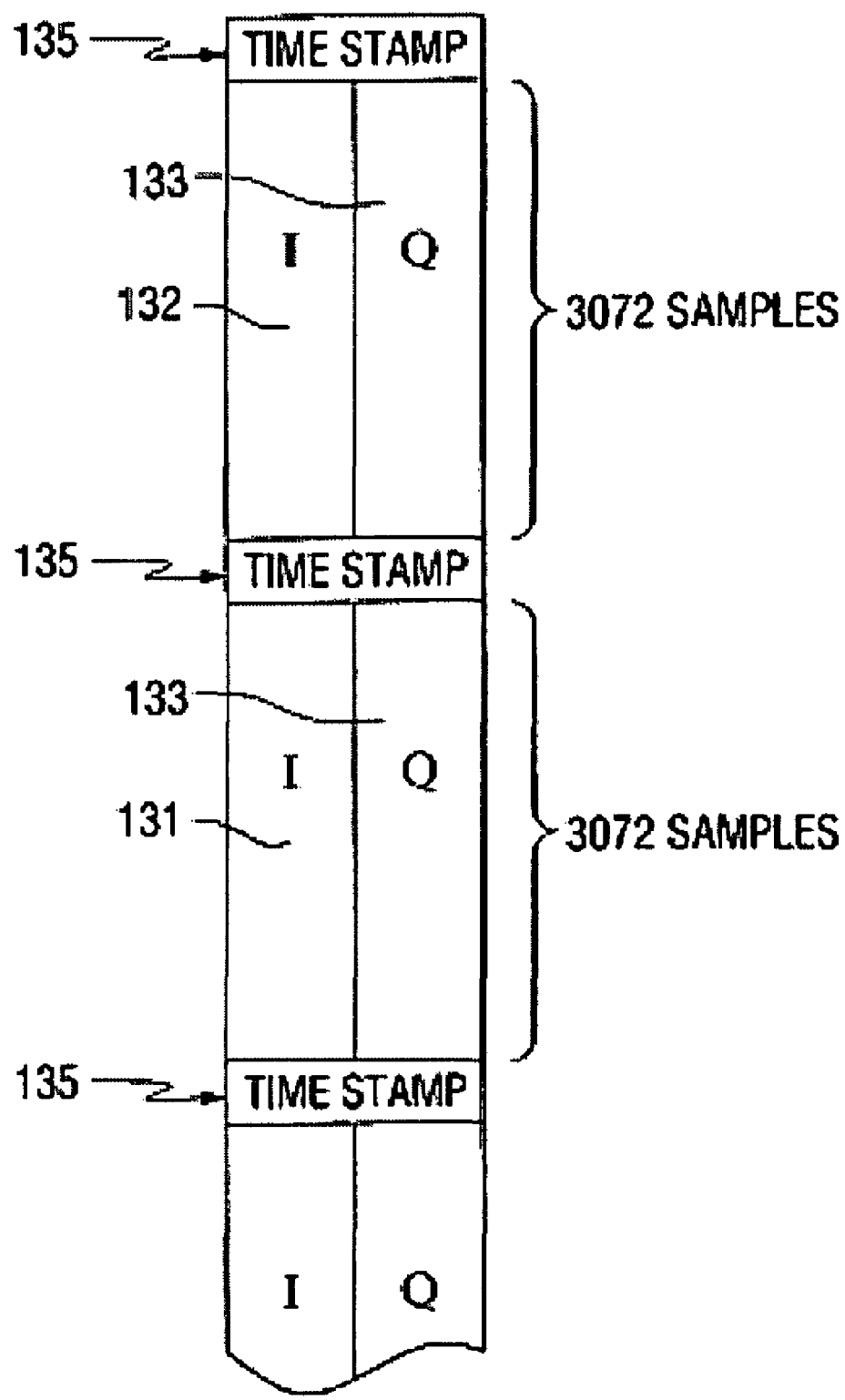
FIG. 11 is a diagram of I and Q samples according to the present invention for the GMSK receiver of FIG. 9.

The samples are thereby segregated into serial blocks of 3072 I samples and 3072 Q samples. FIG. 11 illustrates I sample blocks 132, Q sample blocks 133 and time stamps 135. Since insertion of the time stamps after counting the desired number of samples will likely not coincide with the occurrence of a timing pulse supplied from an external source (such as a GPS receiver) the time stamps 135 may comprise an offset value from the immediately previous time stamp. Further, in most applications, the timing pulse period is sufficiently long to allow all samples associated with an event to be processed (to determine the time of arrival of the event signal) in less than a time interval between two successive timing pulses.

As each I and Q sample block pair (each pair comprising 3072 samples) is accumulated, die blocks are input to the DSP 124, comprising a discriminator 140 for frequency demodulation (recall in the illustrated example GMSK modulation is employed) where the individual samples are processed to determine the modulating information signal or message signal according to the equation.

$$(d/dt)(\tan^{-1} Q/I)$$

Thus the output values from the discriminator 140 are real samples (i.e., not I and Q samples) of the message signal.

The discriminator output values are loaded (one sample at a time) to a buffer 146 (in one embodiment implemented in software and written in C code) comprising L+1 memory locations. The samples are loaded to consecutive buffer memory locations, beginning at memory location 0, through a counter 148 that counts the samples according to an index i: 1:3072 (recall that a time stamp is inserted after every block of 3072 samples). When a sample is loaded to a memory location the previous value in that memory location is overwritten. When the index reaches 3072, the first sample from the next sample block is input to the buffer 146. As illustrated in FIG. 10, the first sample is input at the ith (0) location of the buffer 146, the second sample is input at the i+1 location, the third sample is input at the i+2 buffer location, etc. The buffer location receiving the next sample, that is, the buffer index, is determined according to a modulo operation. The buffer index is the remainder determined by dividing the current buffer index by a length of the buffer 146.

A size of the buffer 146 is strategically chosen such that L=(N−1)M, where N is the number of bits per message and M is the number of samples per bit. In one embodiment N=78 bits/message and M=139 samples/bit, thus L=10,703 and the buffer 146 comprises 10,704 memory locations. It is not necessary for the number of buffer memory locations to be an integer multiple of 3072, nor is it necessary for the number of samples in a message to be an integer multiple of 3072.

In another embodiment the number of memory locations in the buffer 146 is N×M. Such a buffer has sufficient capacity to store all samples of the message. However, as will be described further below, to detect a valid message according to the teachings of the present invention it is necessary to process only one sample of each message bit, including the last bit, to detect a valid message. The message is detected using one sample from each bit, including the first to arrive sample of the last message bit. Thus L=(N−1)M is sufficient to detect a valid message, where the buffer has L+1 memory locations to store at least one sample from each message bit.

By detecting the message using only one sample of the last bit, the apparatus and method of the present invention reduces the number of required memory locations for the buffer 146 (that is, the number of required memory locations is reduced by a number of samples in a bit less one). Further, the invention saves processing time and resources since message detection occurs after the first sample of the last bit arrives, instead of waiting for all samples of the last bit as is known by the prior art.

The capacity of the buffer is directly related to the sampling rate of the GFSK signal (recall that the sampling occurs at the intermediate frequency) and the location accuracy is directly related to the sampling rate to a point, beyond which additional accuracy cannot be obtained. A higher sampling rate requires a larger buffer. But it is also known that the accuracy of the synchronizing pulses at each receiving site also limits location accuracy.

The objective of the following processing steps is to detect the message and determine the time at which the signal carrying the message arrived at a receiving site (and the TOA at several receiving sites for a TDOA application). The TOA is determined relative to a timing pulse available at all receiving sites (either supplied to the receiving sites from a common external source or generated internally at the receiving sites) and synchronized at au receiving sites. In one embodiment, the TOA is specifically determined relative to a time stamp related in time to the timing pulses. Since all the receiving sites are synchronized to the same timing pulses, the TOA of the signal relative to the same timing pulse can be determined at each receiving site, i.e., the TOA can be determined at each receiving site. The TDOA can then be determined for pairs of sites and then the location can be determined from the TDOA as described above. Since each of the receiving sites receives signals from many different transmitters (in the trunked radio application) it is further necessary to ensure that each receiving site determines the TOY of the same signal/message, since this is required for the TDOA determination. Thus message detection is required. In one application die message of interest does not include a preamble (which is commonly used to determine TOA) nor any timing or synchronizing pulses.

Sample outputs are tapped from the buffer 146 at buffer memoir locations (i+1), (i+1+M), (i+1+2M) ... L=i+1+(N−1)M, representing a time variant comb-like selection of samples from the buffer 146, with the tapped samples spaced apart a distance equal to the bit interval (or more specifically, the number of samples in the bit inter % al). Thus each sample in the buffer is derived from a different message bit, i.e., each sample represents a different message bit. For an application where M=139 samples/bit, the taps are spaced apart by 139 memory locations. Thus each tap processes a sample value from a different bit. FIG. 10 depicts a location of the taps at a i=0, as i is incremented the taps move around the buffer 146 and the buffer input value from the counter 148 is input to the next buffer memory location. Whenever a new sample is input to the next successive buffer location the taps increment to the next memory location. The effect of loading samples from the counter 148*s* to successive memory locations while the taps are also moving is similar to a rotation of a first wheel within a second rotating wheel.

FIG. 12 depicts exemplary memory locations 0 through 10 of a buffer to further explain operation of the buffer 146. A message to be detected by the FIG. 12 buffer comprises four bits and three samples per bit. Thus when the four comb-like taps are each responsive to a different sample from the four bits, the message is detected. The buffer memory locations are designate 1-10 (like the buffer 146, the number of memory locations is equal to 1 plus a product of the number of bits less one and the number of samples per bit, or 1+(3×3)=10). The contents of each memory location are signal samples designated by a letter S followed by an Arabic numeral. A message of interest comprises four bits, signal samples S1-S3 are derived from a first message bit, signal samples S4-S6 are derived from a second message bit, signal samples S7-S9 are derived from a third message bit and signal samples S10-S12 are derived from a fourth message bit. At a time t1 sample values S0 through S3 are present in memory locations 1 through 3 and locations 4-10 store sample values from other received messages as identified by a letter X. The taps (depicted in FIG. 10 by a box encircling the sample number) are responsive to sample values stored in memory locations 1, 4, 7 and 10, that is, sample values S1, X, X, and X. Therefore a valid message is not detected. Recall that the sample values are loaded serially into successive buffer locations.

As will be described further below, at time t1 the tapped values are analyzed to determine whether they represent a valid message. Since only the first tapped sample value is part of a valid message (that is, it represents the first bit of the four bit message) the analysis process fails to detect a valid message at time t1.

At time t2 additional message samples S4-S7 have been loaded into the buffer (the samples having been loaded as the buffer index increments). Also, each tap moves three locations, one location for each increment of the buffer index. A valid message is not detected since memory locations 7 and 10 do not store samples from the message of interest. At time t3 additional message samples S7 and S8 have been loaded to respective memory locations 7 and 8. The tap locations also move by two memory locations. When the tapped values are analyzed at time t3, as described below, a valid message is not detected since the tapped samples S5 and S6 are from the same message bit and the tap at memory location 9 is not responsive to a sample from the word of interest.

At time t4 additional message samples S9 and S10 have been loaded into buffer locations 9 and 10. Also, each tap moves two memory locations since two new samples have been loaded. A valid message is not yet detected; the taps responsive to the samples S1, S4 and S7 detect one sample from each of three message bits, but there is no tapped sample from the fourth message bit. At time t5 additional message samples S11 and S12 have been loaded to respective memory locations 1 and 2 (recall that the FIG. 2 buffer is a circular buffer although it is not depicted as such). The tap locations also move by two memory locations. When the tapped values are analyzed at time t5 a valid message is detected as the taps are responsive to samples S3, S6, S9 and S10, i.e., one sample from each of the four different words in the message of interest. Note that it is not necessary for the FIG. 12 buffer to include a memory, location for all samples of all message bits.

The process of using the tapped values to determine a value message is now described with continued reference to FIG. 10. Each selected sample is processed through a hard decision element 152 to generate a binary bit responsive to the sample. Each hard decision element 152 outputs a one if the stored sample is greater than a predetermined threshold and outputs a zero if the stored sample is less than the predetermined threshold. As described further below, a message will be properly detected (i.e., a valid message determined) when error detection/correction processes operating on the bits generated from the samples indicate that the bits represent a valid message.

The binary bit generated by each hard decision element 152 is input to a memory location of an output buffer 156. The output buffer 156 comprises N memory locations designated 0 (N−1), where N is the number of bits in a message. As new samples are loaded to the buffer 146, the output buffer 156 accumulates a different message-size plurality of bits. That is, as new samples are loaded to the buffer 146 the taps supply different bits to the output buffer 156. Since the bits in the output buffer 156 were derived from samples taken at different points on the received signal waveform, they represent a candidate message, i.e., after further processing the candidate message may be declared a valid message equivalent to the message sent from the transmitter 30.

The contents of the output buffer 156 are treated as a single data message for processing through a dc-interleaving operation, a Viterbi decoder (to decode the convolutionally encoded bits) and a descrambler, as depicted by a functional block 170 in FIG. 10. These processes are inverse operations of those performed by the elements of the transmitter 30 (FIG. 3) on the information signal with its CRC appended bits, as generated in the functional block 34.

The functional block 170 further includes a CRC check or CRC detector (in one embodiment employing a hard decision detection process) that determines the CRC value for the bit stream after the processes of the functional block 170 have been performed. A CRC decision operation is identified by a decision step 174, where a nonzero CRC decision indicates that the contents of the output buffer 156 do not represent a valid message, i.e., as transmitted by the transmitter 30. Responsive to a non-zero CRC, another sample value is loaded from the discriminator 140 to the buffer 146 after which the tapped values are again analyzed to determine whether the tapped values (as stored in the output buffer 156) represent a valid message. The index "i" is also incremented by one responsive to the new loaded value.

The process of incrementing the counter i, loading a new value to the buffer 146, supplying bits to the output buffer 156 via the hard decision elements 152, processing the bits in the output buffer 156 through the functional processes of the block 170 and determining the CRC check value at the decision step 174 continues until the decision step 174 returns a zero value, indicating that the contents of the output buffer 156 are a valid message. When a valid message is detected, processing continues at a block 180 where the n data bits generated from the descrambling process are extracted. Note there are fewer data bits (n) than message bits, the difference equal to the number of CRC bits.

Since the present invention uses samples of the message bits to detect the message and determine the TOA therefrom, noise having a duration less than a bit period (that is, corrupting less than all the samples of a message bit) will not negatively affect the TOA result.

Once a valid message has been declared by the CRC detector, in one embodiment a false alarm process is initiated to ensure that the detection process described above did not generate a false alarm message. A false alarm occurs when a valid message has been declared by the CRC detector (CRC=0), but in fact the message is not the same message that was produced by the message source 34 in the transmitter 30 (that is, the BER≠0). Such a false alarm message may occur, for example, when a relatively "weak" CRC code is employed within the functional block 34 of the transmitter 30 (see FIG. 3). (Of course the same CRC code is employed in the CRC detection process of the functional block 170.) A CRC code of about 17 bits may be considered a relatively "weak" CRC.

Recall that in a location application of the present invention, the TOA of a signal transmitted from a radio is received at a plurality of receiving sites and processed to determine the TDOA and the location. Each receiving site must determine the TOA of the same signal and must therefore determine an identification of the radio (transmitter) that sent the signal. The identification information is required to ensure the TDOA computation is performed on the same signal from the same transmitting radio as received at the plurality of receiving sites. Thus in the location determination application a false alarm signal should not be used in the TDOA determination since the false alarm signal will likely not provide correct radio identification information. TDOA computing resources are wasted by attempting to determine a TDOA when the transmitting radio is improperly identified. Processing resources at the receiving sites are also wasted since the determined TOA with an erroneous radio identification cannot be used to determine the TDOA. Instead, such resources could have been beneficially allocated to processing other received signals including valid transmitter identification information for TOA information for other transmitting radios.

One normally optimizes the receiver for better probability of detection at the expense of increasing the probability of a false alarm, as the two parameters are normally coupled and interdependent. The present invention severs this interdependency by adding another level of processing following demodulation and detection that increases the received signal integrity by subjecting the message to a bit error check operation. When the probability of detection is optimized, the present invention totally eliminates the probability of false alarms.

The false alarm processing of the present invention operates on the valid n-data bits (of the detected message) as determined by the block 180 in FIG. 10. These extracted data bits (the detected message or information) are processed through a functional block 190 comprising a CRC encoding process (during which CRC bits are determined and concatenated to the message bits), a convolutional encoding process for creating an n-bit encoded message and an interleaving process.

The re-encoded/re-processed bits from the functional block 190 are subjected to a false alarm test by comparing, bit for bit, the bits in the output buffer 156 with the re-encoded/re-processed bits in a bit error rate (BER) check block 194. If a decision block 198 returns a BER=0 message the decoded message is not a false alarm. A non-zero BER indicates a false alarm and returns processing to the counter 148 to continue loading and processing additional message bits until both the CRC=0 as determined at the decision block 174 and the BER=0 as determined at the decision block 198. In another embodiment it may be possible to accept a limited number of false alarms and thus a BER>0 can be used.

Further responsive to the BER=0 condition, the decoded message bits depicted by the block 180 are sent to the time of arrival algorithm, as described further below, where the false alarm-free signal produces a more accurate TOA estimate and therefor a more accurate TDOA and location than available from the prior art signal processing approaches. To this point in the signal processing chain the time of arrival has been determined with an accuracy of one bit period. Additional processing as described below can increase the TDOA accuracy by determining the TOA within a bit period.

The repeated or double-block message of FIG. 6 can be demodulated and detected by the receiver 100 of the present invention without specifically identifying and deleting the spacer bit sequence (101010 in one embodiment). In either a single or a double-block application, once the first message block is correctly detected by operation of the buffer 146 and its related processing components, the next samples represent either the beginning of a new single message block (back-to-back messages) or the spacer bits. In either case the buffer 146 continues to input samples one at a time. If the inputted samples comprise the spacer bits they will not produce a zero CRC check and thus the process of inputting and processing additional samples continues until a zero CRC is realized.

The innovative demodulation and detection techniques comprising loading the message samples one sample at a time into the buffer 146 then detecting the message using the sample-based CRC technique offers superior processing speed as it does not require shifting a fully loaded circular buffer (i.e., shifting the value stored in each memory location by one memory location) to load a new sample value into the vacated memory location. Also, the invention determines a valid message by analyzing one sample per message bit, including one sample of the last message bit. Therefore it is not necessary to load all samples of the last message bit for analysis, the first sample is sufficient to determine a valid message and the TOA. This feature is illustrated in conjunction with FIG. 12 above. Another advantage of the present invention is its ability to detect the message and the TOA of the message without the need for a message preamble or message timing information. Although message TOA determination is one application of the invention as described below, TOA is merely referenced as an illustrative example; any detection process can benefit from the teachings of the invention.

Figure 13:
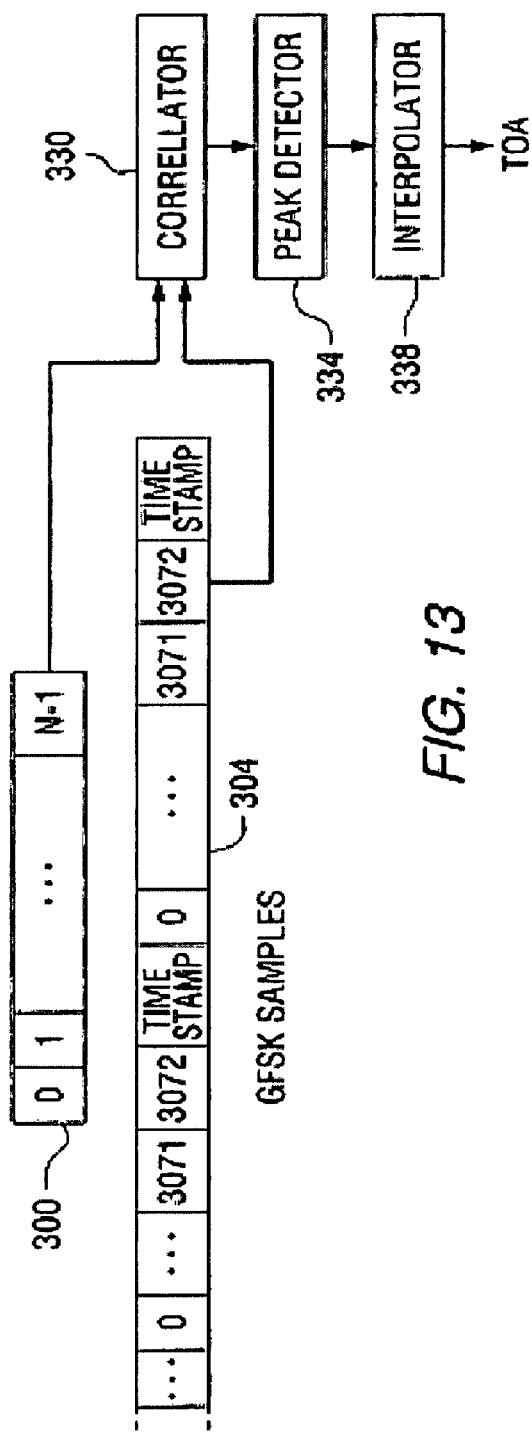
FIG. 13 is a block diagram of components for determining the time of arrival of a signal received at one of the receivers of FIG. 9.

To determine the TOA of the message received at the receiver 100, the valid message samples derived from the N detected bits (one message sample per message bit) from the buffer 146/block 180 of FIG. 10 are captured in a buffer 300 of FIG. 13, where the samples are designated 0 to N−1. These N samples are determined from the contents of the output buffer 156 (through the functional block 180) when both the CRC=0 and the BER=0. Specifically, the message samples stored in the buffer 300 are the contents of the tapped buffer locations when both CRC=0 and BER=0. Thus the N samples represent a valid message.

In one embodiment the message comprises N=78 transmitted bits (each bit represented by M=139 samples for processing as described above and the entire message represented by about 3.5 sample blocks, each sample block comprising 3072 GFSK samples). In an application where the receiver 100 operates to determine location, the number of samples per bit (M) (or the time between samples) may be selected to yield a desired time of arrival granularity and therefore a desired location accuracy, with due regard for hardware and time-based processing limitations. The accuracy of the time of arrival determination, which is based on the time of arrival of a message bit sample, is limited by the time between two consecutive message bit samples, that is 2000 ns. Another embodiment of the present invention uses interpolation techniques to determine the time of arrival between two consecutive message bit samples, yielding a time of arrival that is more accurate than the 2000 ns limitation.

To begin the TOA determination process after a valid message has been detected, the blocks of time-stamped GFSK samples (each block including 3072 GFSK samples and its associated time stamp (TS)) are loaded into a buffer 304 of FIG. 13. The TOA determination process is diagrammatically illustrated in FIG. 14 where each sample within the blocks of 3072 GFSK samples and the time stamp (stored in the buffer 304 of FIG. 13) are represented by upper case alphabetical characters. The message samples (or message bit samples, since there is one sample per message bit) (as stored in the buffer 300 of FIG. 13) are represented by lower case alphabetical characters, and the N bits (determined from the message samples as described above in conjunction with FIG. 10) are represented by exemplary binary values.

Figure 14:
FIG. 14 is a schematic illustration of the time of arrival determination process.

During the TOA determining process, the GFSK samples (in the buffer 304) are shifted right, stepping the GFSK samples relative to the message bit samples (in the buffer 300). The shifting or stepping process aligns successive GFSK samples with each message bit sample. As illustrated in FIG. 14, GFSK samples 310 and 312 (S and P) are aligned with respective message bit samples 320 and 322 (b and c). Since the time between consecutive message bit samples (for example, message bit samples 320 and 322) is longer than the time between consecutive GFSK samples (2000 ns in one embodiment), when message bit samples are aligned with GFSK samples there are multiple GFSK samples between two consecutive aligned GFSK samples. This can be seen in FIG. 14 where there are multiple GFSK samples (represented by the upper case alphabetical characters) between the aligned GFSK samples 310 and 312.

The GFSK samples are shifted light one sample at each shift, where each shift represents 2000 ns. As the first GFSK sample block is shifted relative to the message bit samples, the second GFSK sample block is loaded into the buffer 304. The second GFSK sample block is also illustrated in FIG. 14.

As the shifting and loading processes continue, the contents of the buffer 300 (one sample for each of the N message bits) and the buffer 304 (the GFSK samples) are compared in a correlator 330 of FIG. 13, generating correlation values representing the correlation of the N message bit samples with the GFSK samples. A correlation peak or highest correlation value, as detected by a peak detector 334, occurs when the GFSK samples in the buffer 304 match the message bit samples in the buffer 300. The time of arrival is then determined as the time stamp of the rightmost GFSK sample block in the buffer 304 plus the product of 2000 ns and the number of time lags or buffer shifts (the distance between successive GFSK samples is 2000 ns) between entry of the rightmost sample block in the buffer and occurrence of the correlation peak. Further accuracy of the TOA (if desired for a more accurate location determination) can be determined by interpolation as described below.

Earliest detection of the correlation peak occurs when a GFSK sample adjacent the block time stamp matches the first message bit sample while subsequent GFSK samples match a subsequent message bit sample. The latest peak detection occurs when a GFSK sample farthest from the block time stamp matches the first message bit sample while subsequent GFSK samples match a subsequent message bit sample.

Figure 15:
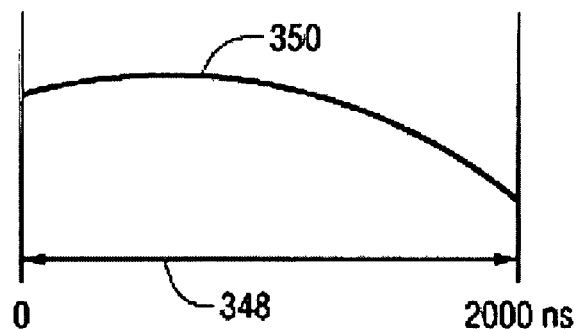
FIG. 15 is an illustration of the interpolation process associated with the time of arrival determination according to one embodiment of the invention.

To further improve the TOA accuracy and thus the transmitter location accuracy, after detecting the correlation peak in the peak detector 334 to a resolution of 2000 ns (the spacing of the GFSK samples in one embodiment) an interpolator 338 of FIG. 13 determines an interpolated peak location within the 2000 ns interval. In one embodiment, the interpolated peak is located with a 20 ns resolution using a spline interpolation process. Within the interpolator functional block, the 2000 ns interval 348 (see FIG. 15) in which a peak 350 was detected is segregated into one-hundred 20 ns intervals. The value of the function is determined at each of these one-hundred points according to the spline interpolation process. The maximum determined value is selected and the 20 ns interval in which the maximum occurred is also determined. (Alternatively, the ratio (fraction) of the number of 20 ns intervals from the beginning of the 2000 ns interval to the peak and the total number of intervals is determined.) With this interpolation refinement, the TOA is determined from the equation below.

TAO=(time stamp)+(number of lags to correlation peak)×(2000 ns)+(fraction of 2000 ns interval to peak)×(2000 ns)

Figure 16:
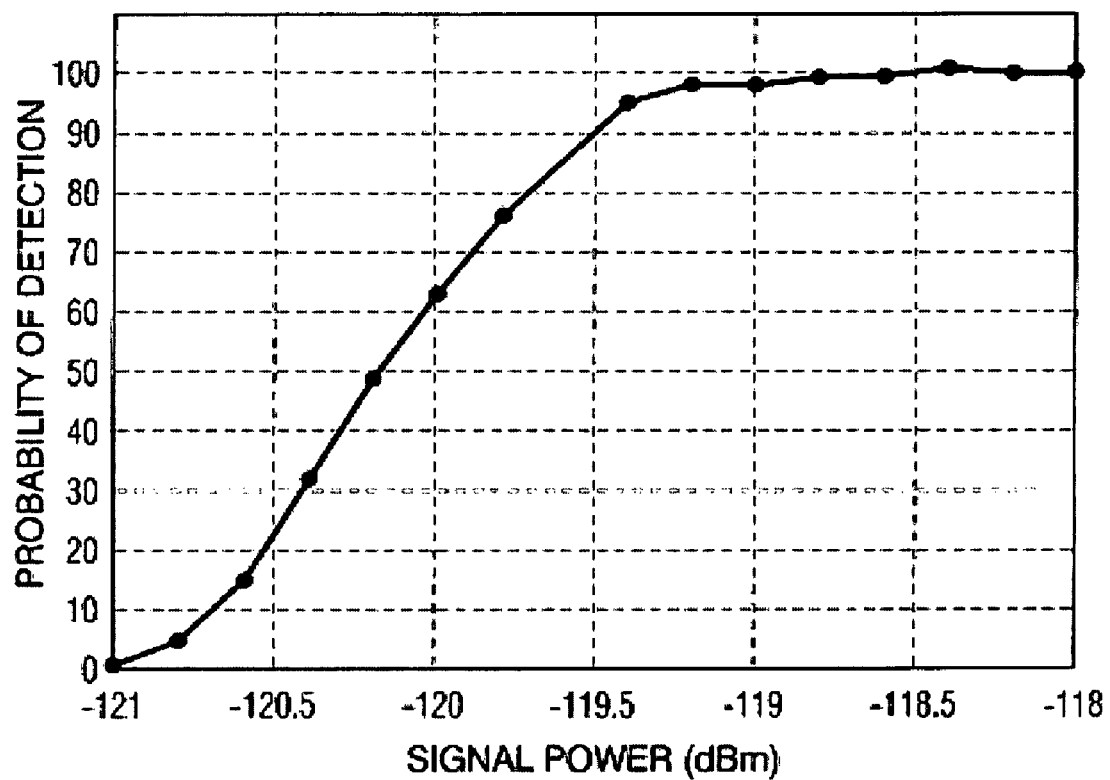
FIG. 16 is a graph illustrating performance of the receiver of FIG. 9.

FIG. 16 depicts performance of the preferred embodiment of the invention for a two-block message such as illustrated in FIG. 6.

In other embodiments, in lieu of using a CRC code in the process depicted in FIG. 10, other error detection/correction processes, such as a BCH codes, linear block codes, convolutional codes, turbo codes, etc. can be used. Thus the invention is not limited to CRC codes, as any error detecting codes (as applied to the message data) and capable of determining that the bits in the output buffer 156 represent a valid message, is suitable for use with the present invention.

The present invention can be implemented with various hardware and software elements, including on any digital signal processing (DSP) hardware platform. Even though the invention has been described with reference to GFSK signals, those skilled in the art recognize that the teachings of the invention are not restricted to GFSK, but can be applied to other types of modulation schemes. Although the invention has been described with reference to signal information bits, as is known by those skilled in the art in certain signal protocols symbols replace bits with each symbol representing two or more information bits. Therefore the invention can also be used in such symbol-based communications systems.

In an embodiment comprising a buffer that can store all of the message samples (recall that the buffer 146 of FIG. 10 stores the message samples in blocks of 3072 samples), it is unnecessary to break the message samples into blocks, insert a time stamp at the beginning of each block and count the number of samples as they enter the buffer. Instead all message samples are stored and shifted through the buffer and its attendant components of FIG. 10.

Although the invention has been shown and described with respect to a certain preferred embodiment or embodiments, it is obvious that equivalent alterations and modifications will occur to others skilled in die art upon the reading and understanding of this specification and the annexed drawings. In particular regard to the various functions performed by the above described components (assemblies, devices, functional blocks, circuits, etc.), the terms (including any references to "means") used to describe such components are intended to correspond, unless otherwise indicated) to any component that performs the specified function of the described component (i.e., that is functionally equivalent), even though not structurally equivalent to the disclosed structure that performs the function in the exemplary embodiments of the invention. In addition, while a particular feature of the invention may have been disclosed with respect to only one of several embodiments, such feature may be combined with one or more other features of the other embodiments as may be desired and advantageous for any given or particular application. Thus various changes may be made and equivalent elements may be substituted for elements thereof without departing from the scope of the present invention.

What is claimed is:

1. A method for determining a location of a wireless transmitting device transmitting a digitally modulated transmitted radio frequency signal, the method comprising:
at spaced-apart receivers:
generating a received radio frequency signal and including time tags therein responsive to the transmitted radio frequency signal;
generating received radio frequency signal samples responsive to the received radio frequency signal;
detecting a destination message signal responsive to the received radio frequency signal;
comparing the destination message signal and the received radio frequency signal;
determining a time of arrival of the destination message signal responsive to the step of comparing and responsive to the time tags;
determining a pairwise time difference of arrival of the received radio frequency signal for two pairs of receivers;
determining the location of the device responsive to the pairwise time difference of arrival; and
wherein the step of detecting the destination message signal further comprises:
(a) incrementally loading the received radio frequency signal samples to successive memory locations of a buffer;
(b) selecting received radio frequency signal samples stored in selected memory locations;
(c) for each selected sample, determining a detected sample responsive to the selected sample;
(d) loading the detected samples into a memory device, wherein a capacity of the memory device is sufficient to store one detected sample for each symbol of the destination message signal;
(e) analyzing the detected samples to determine if the detected samples form a valid destination message signal; and
(f) repeating the steps (a) through (e) until a result at the step (e) indicates the detected samples form a valid destination message signal.

2. The method of claim 1 wherein a step (e) further comprises applying a cyclical redundancy code check to the detected samples to determine if the detected samples form a valid destination message signal.

3. The method of claim 1 wherein responsive to the detected samples forming a valid destination message signal, the method further comprises:
(j) encoding the detected samples using an error detection code to produce encoded samples;
(k) comparing the encoded samples with the detected samples;
(l) determining a bit error rate responsive to the step (k);
(m) if the bit error rate is less than a predetermined threshold, declaring the detected samples to be valid; and
(n) if the bit error rate is greater than the predetermined threshold, returning to the step (a) for loading another received radio frequency signal sample to the next successive memory location.

4. The method of claim 1 wherein responsive to incrementally loading another received radio frequency signal sample to a successive memory location according to the step (a), the selected memory locations of the step (b) are incremented to the next successive memory location.

5. The method of claim 1 wherein a number of memory locations between two consecutive memory locations comprises a number of samples in each symbol of the destination message signal.

6. The method of claim 1 wherein the buffer comprises a circular buffer.

7. The method of claim 1 wherein the buffer comprises a number of memory locations equal to 1+(N−1)(M), where M is a number of samples in each symbol of the destination message signal and N is a number of symbols in the destination message signal.

8. The method of claim 1 wherein the detected samples will form a valid destination message signal after processing only one sample of the last symbol of the destination message signal.

9. An apparatus for determining a location of a wireless transmitting device transmitting a transmitted RF signal, the apparatus comprising:
at spaced-apart receivers:

a first module for generating a received RF signal and including time tags therein responsive to the transmitted RF signal, the time tags synchronized at the receivers;

a second module for determining a valid message responsive to the received RF signal;

a third module for comparing the valid message and the received RF signal to determine a time of arrival of the message further responsive to the time tags;

determining a pairwise time difference of arrival of the message at two pairs of receivers;

determining the location of the device responsive to the pairwise time difference of arrival; and wherein the second module further comprises:

first memory locations for storing samples of the received RF signal, wherein successive samples of the received RF signal are incrementally input to successive first memory locations;

bit detectors, each bit detector associated with one of the first memory locations, wherein the sample stored in the one of the first memory locations is input to the associated bit detector for producing a bit value;

a memory buffer having a number of second memory locations equal to the number of bit detectors, each bit detector supplying the bit value to the associated second memory location; and a fourth module operating on the bit values in the memory buffer for determining if the bit values present a valid message, and wherein if a valid message is not presented, a next sample of the received RF signal is input to a next one of the first memory locations, overwriting a sample previously stored therein and the bit detectors are associated with a next one of the first memory locations, the fourth module operating on bit values until a valid message is presented in the memory buffer.

* * * * *